United States Patent
Chen

(10) Patent No.: US 7,338,194 B2
(45) Date of Patent: Mar. 4, 2008

(54) LIQUID CRYSTAL DISPLAY AND BACKLIGHT MODULE THEREOF

(75) Inventor: Shin-Li Chen, Linnei Township, Yunlin County (TW)

(73) Assignee: Au Optronics Corp., Hsinchu (TW)

( * ) Notice: Subject to any disclaimer, the term of this patent is extended or adjusted under 35 U.S.C. 154(b) by 144 days.

(21) Appl. No.: 11/054,486

(22) Filed: Feb. 9, 2005

(65) Prior Publication Data

US 2006/0039132 A1    Feb. 23, 2006

(30) Foreign Application Priority Data

Aug. 19, 2004    (TW) .............................. 93124931 A

(51) Int. Cl.
*F21V 29/00* (2006.01)
(52) U.S. Cl. .................. 362/560; 362/561; 362/260; 362/225; 362/580; 362/373
(58) Field of Classification Search ................ 362/560, 362/561, 559, 580, 632, 633, 634, 26, 27, 362/29, 260, 97, 240, 241, 225
See application file for complete search history.

(56) References Cited

U.S. PATENT DOCUMENTS

| | | | |
|---|---|---|---|
| 5,128,781 A * | 7/1992 | Ohno et al. .................... | 346/65 |
| 5,183,323 A | 2/1993 | Daniel .......................... | 362/32 |
| 5,432,626 A | 7/1995 | Sasuga et al. | |
| 6,089,739 A | 7/2000 | Yamamoto et al. | |
| 6,783,256 B2 * | 8/2004 | Moon .......................... | 362/241 |
| 6,871,979 B2 * | 3/2005 | Mai ............................. | 362/241 |
| 6,880,947 B2 * | 4/2005 | Hsieh et al. ................. | 362/614 |
| 7,077,542 B2 * | 7/2006 | Lee et al. .................... | 362/224 |
| 7,207,709 B2 * | 4/2007 | Chuang et al. ............. | 362/633 |
| 2004/0012966 A1 | 1/2004 | Takasaki et al. ............ | 362/348 |

FOREIGN PATENT DOCUMENTS

| | | |
|---|---|---|
| JP | 2001059961 | 3/2001 |
| JP | 2002189207 | 7/2002 |
| TW | 564302 | 12/2003 |

OTHER PUBLICATIONS

Translation of China Office Action mailed Jul. 7, 2006, filed in IDS on September Sep. 14, 2006.

* cited by examiner

*Primary Examiner*—Sharon E. Payne
(74) *Attorney, Agent, or Firm*—Thomas, Kayden, Horstemeyer & Risley

(57) ABSTRACT

A liquid crystal display and a backlight module thereof are provided. A backlight module comprises a light source, a reflector, and a bottom plate. The reflector is disposed under the light source. The bottom plate is disposed under the reflector and facing a lower surface of the reflector. The bottom plate comprises a plurality of trench structures formed on a surface thereof facing the reflector. Heat-produced by the light source mixes with air in the trench structures, and the mixture of heat and air is conducted via the trench structures to the bottom plate, thereby dissipating heat.

14 Claims, 6 Drawing Sheets ved in the rel backlight modules thereof, and in particular to backlight modules utilized in liquid crystal displays.

LIQUID CRYSTAL DISPLAY AND BACKLIGHT MODULE THEREOF

BACKGROUND

The invention relates to liquid crystal displays and backlight modules thereof, and in particular to backlight modules utilized in liquid crystal displays.

Backlight modules provide light in liquid crystal displays. As the size of liquid crystal displays increases, the light intensity of the backlight module is required to be higher. As a result, more lamps are used, and power consumption is increased accordingly. Excess heat, however, is produced during operation, increasing the temperature in the area surrounding the lamps. In some circumstances, although the number of the lamps and power supply are increased, the light intensity cannot be efficiently increased because the high temperature therein reduces the light intensity over time.

An aluminum plate is often used to dissipate heat in the backlight module. As shown in FIG. 1, the conventional backlight module 10 comprises a reflective sheet 11, a diffusion sheet 16, optical films 17a, 17b, a plurality of lamps 13 and aluminum back plate 15. The diffusion sheet 16 covers the lamps 13 disposed above the reflective sheet 11. The lamps 13, supported by a lamp holder (not shown), are the light source of the backlight module 10. The reflective sheet 11 is disposed above the aluminum back plate 15, reflecting light from the lamps 13 out of the backlight module 10. The aluminum back plate 15 is disposed at the bottom of the backlight module 10 to dissipate heat.

The reflective sheet is an essential element used to reflect light; hence, the heat is blocked thereby and cannot be directly transmitted to the aluminum back plate. Thus, heat cannot be quickly dissipated, and temperature increases therein, reducing light intensity.

SUMMARY

An object of the invention is to provide liquid crystal displays and backlight modules thereof with a plurality of trench structures, to increase heat dissipation efficiency, strengthen the structure thereof, and increase light intensity.

Backlight modules are provided. An exemplary embodiment of a backlight module comprises a light source, a reflector, and a plate. The reflector is disposed under the light source. The plate is disposed under the reflector and facing a lower surface of the reflector. The plate comprises a plurality of trench structures formed on a surface thereof facing the reflector. Heat produced by the light source mixes with air in the trench structures, and the mixture of heat and air is conducted via the trench structures to the plate, thereby dissipating heat.

The reflector comprises a plurality of grooves, and the light source comprises a plurality of lamps, parallel to the grooves. At least one groove is disposed between the two lamps.

The cross-section of the grooves is V-shaped or arch-shaped.

The backlight module further comprises a supporting element for supporting light source, disposed at an end of the light source for providing support thereto. The supporting element comprises two sides and at least one opening formed on at least one of the two sides.

The plate comprises a plurality of holes formed thereon such that air in the trench structures is dissipated through the holes.

The trench structures protrude away from the reflector.

The cross-section of the trench structures is circular, elliptical, striped or rectangular.

The trench structures are arranged in parallel, crisscross, or disordered.

The trench structures comprise at least one channel.

The plate comprises aluminum.

Further a backlight module is provided, comprising a light source, a reflector, a plate, and a supporting element. The reflector, disposed under the light source, comprises a plurality of grooves. The plate is disposed under the reflector and facing a lower surface of the reflector. The plate comprises a plurality of trench structures. The supporting element is disposed at an end of the light source for providing support thereto, and the supporting element comprises two sides and at least one opening formed on at least one of the two sides.

Liquid crystal displays utilizing the backlight module are also provided.

DESCRIPTION OF THE DRAWINGS

Backlight modules can be more fully understood by reading the subsequent detailed description in conjunction with the examples and references made to the accompanying drawings, wherein.

DETAILED DESCRIPTION

Figure 1:
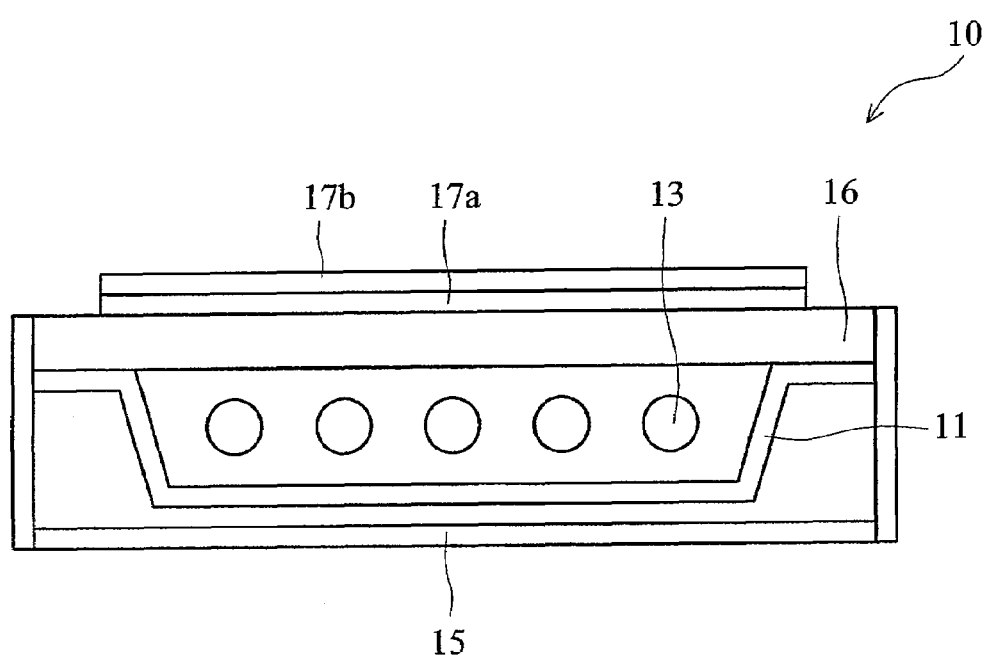
FIG. 1 is a cross-section of a conventional backlight module.
Figure 2:
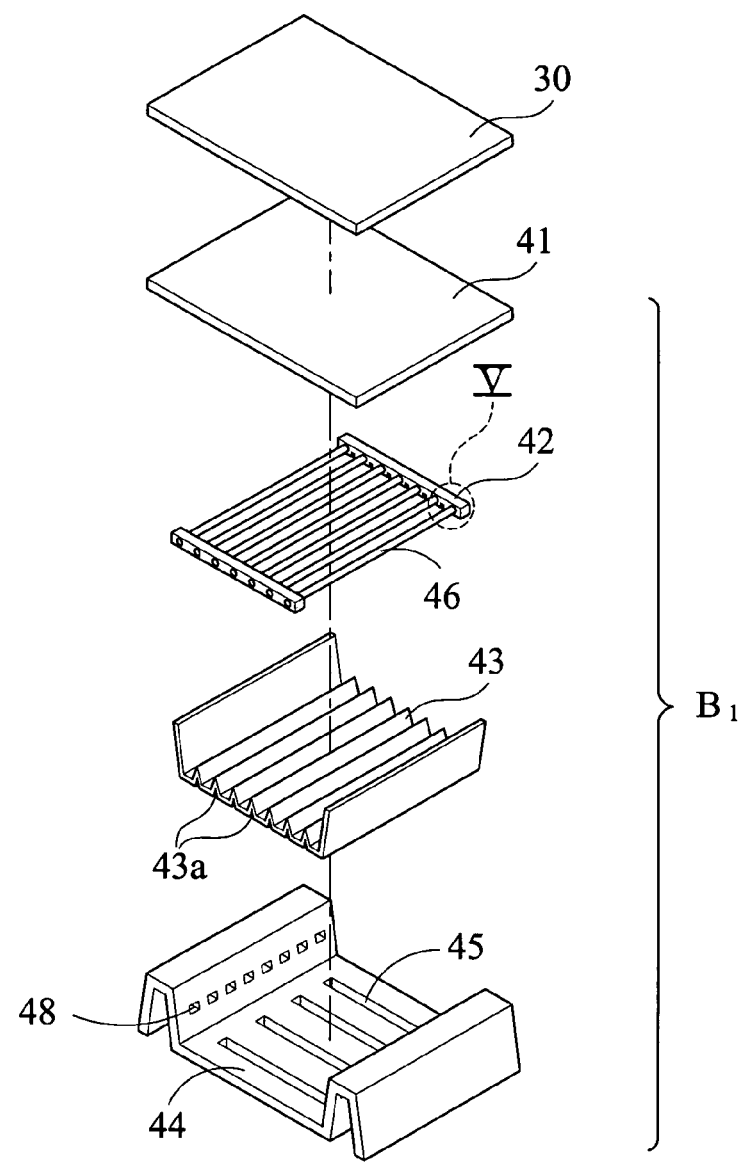
FIG. 2 is an exploded view of an embodiment of a liquid crystal display.

FIG. 2 is an exploded view of an embodiment of a liquid crystal display $L_1$. The liquid crystal display $L_1$ comprises a liquid crystal panel 30, and a direct backlight module $B_1$. The backlight module $B_1$ is under the liquid crystal panel 30. The backlight module $B_1$ is modified to increase heat dissipation, light intensity and strength of the plate 44, is described hereinafter, while the description of other elements of the liquid crystal display is omitted.

Figure 3A:
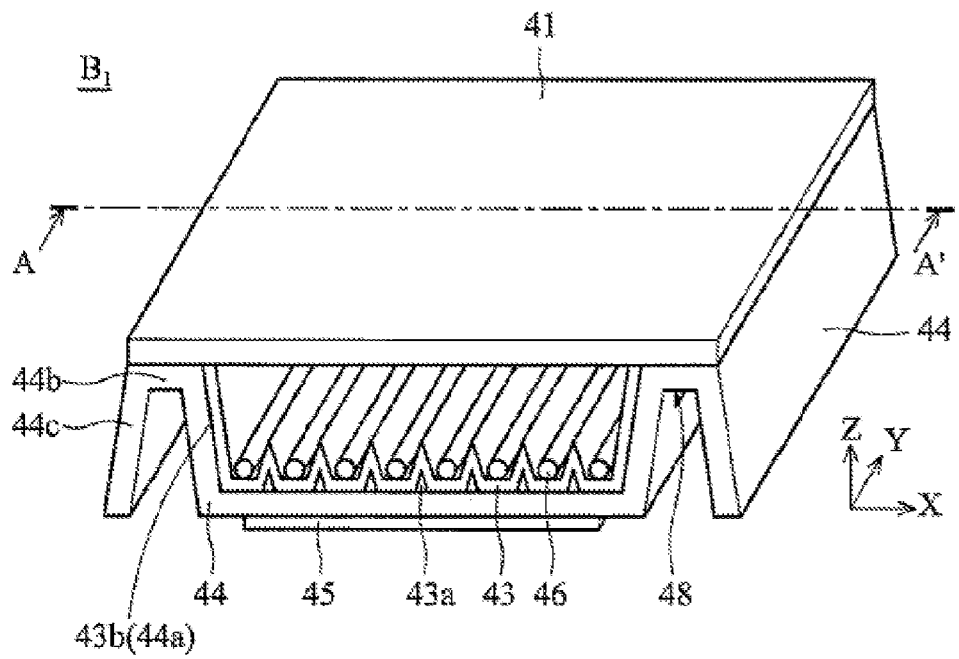
FIG. 3A is a perspective view of an embodiment of a backlight module after assembly.
Figure 3B:
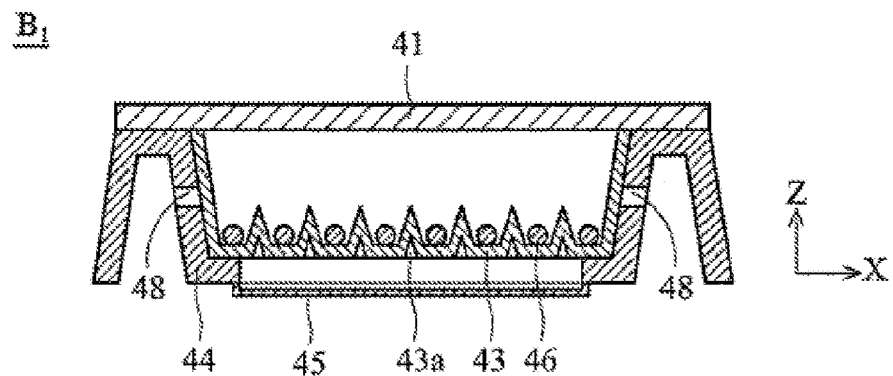
FIG. 3B is a cross-section of the backlight module along line AA of FIG. 3.

FIG. 3A is a perspective view of an embodiment of a backlight module $B_1$ after assembly. FIG. 3B is a cross-section of the backlight module $B_1$ along line AA of FIG. 3. The backlight module $B_1$ comprises a diffusion sheet 41, a supporting element 42, light sources (lamps) 46, a reflector 43, and a plate 44. Note that the supporting element 42 is only shown in FIG. 2, and omitted in FIGS. 3A and 3B.

The connection between the diffusion sheet 41, the supporting element 42, a plurality of lamps 46, a reflector 43, and the plate 44 is described in the following.

The diffusion sheet 41 is disposed above the plate 44. Specifically, the diffusion sheet 41 is disposed directly on and contacts the plate 44. That is, the plate 44 substantially supports the diffusion sheet 41. The supporting element 42 supports the light sources 46. Each of the light sources 46 is disposed on the supporting element 42 without contacting the reflector 43. The light sources 46 can be cold cathode fluorescent lamps (CCFL). The reflector 43 is disposed between the plate 44 and the light sources 46, reflecting light out of the backlight module $B_1$. A plurality of grooves 43a are formed between the reflector 43 and the plate 44. That is, the reflector plate 43 is wave-shaped or non-flat. The grooves 43a and the lamps 46 are parallel. Each groove 43a is disposed between two lamps 46. Thus, the grooves 43a and the lamps 46 are alternatively arranged. As shown in FIG. 3B, the cross section of the grooves 43a is V-shaped. The grooves 43a, however, are not limited to a V-shaped. In a varied embodiment, the grooves 43a can be arc-shaped, and the shape thereof can also be varied in different embodiments.

The plate 44 can be made of aluminum or comprise the same. The plate 44 is disposed under the reflector 43 with partial contact therebetween. Specifically, the reflector 43 comprises two non-horizontal side surfaces 43b, and the plate 44 comprises two non-horizontal side surfaces 44a, two connecting portions 44b, and two standing portions 44c. The non-horizontal side surfaces 43b of the reflector 43 and the non-horizontal side surfaces 44a of the plate 44 are at least overlapped and in substantial contact. The connecting portions 44b connect the standing portions 44c and the non-horizontal side surfaces 44a. The standing portions 44c are away from the non-horizontal side surfaces 44a. Trench structures or channels 45 are formed on the surface of plate 44 facing the reflector 43. The trench structures 45 protrude away from the reflector 43. That is, the trench structures 45 protrude toward the lower cover (not shown), parallel to the plate 44 such that the heat produced from the lamps 46 mix with air in the trench structures 45, and the mixture of heat and air is conducted via the trench structures 45 to the bottom plate 43, thereby dissipating heat out of the backlight module.

The cross-section of one of the trench structures 45 can be circular, elliptical, striped or rectangular, arranged in parallel, crisscross, or disordered. In this invention, the trench structures 45 are stripe-shaped and arranged in parallel. The extending direction of each trench structure 45 is substantially perpendicular to the extending direction of the lamps 46 and the grooves 43a.

Figure 4:
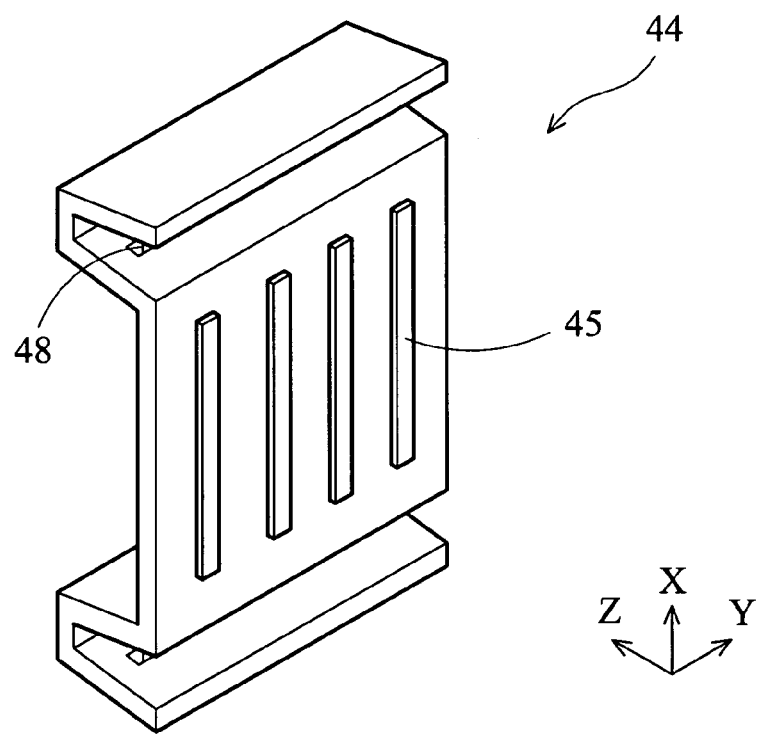
FIG. 4 is a rear view of a plate of the backlight module.

As shown in FIG. 4, only the plate 44 of FIG. 2 is shown, and other elements are omitted to clearly show the trench structures 45 thereon. Holes 48 are formed on the plate 44. Note that the invention does not limit the shape and location of the holes. The heated air can dissipate through the holes 48.

Figure 5:
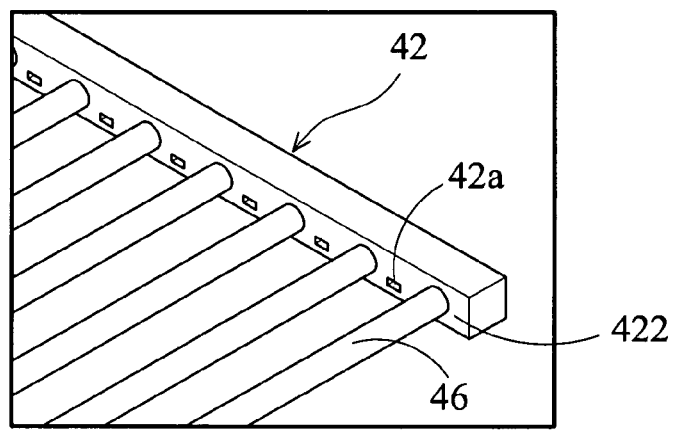
FIG. 5 is a local enlarged view of a lamp and a supporting element of the backlight module.

FIG. 5 shows a local enlarged view of the supporting element 42. The supporting element 42 comprises two sides 422 and at least one opening 42a formed on at least one of the two sides 422. Air can be directed through the holes 42a to the grooves 43a and the trench structures 45 to increase airflow therein. Thus, the multi-channel design can increase contact area between airflow and heat, reducing temperature and preventing reduction of light intensity. The invention does not limit the shape of the opening 42a. In the figure, the opening 42a is rectangular, but can be other shapes.

Since hot air tends to rise, heat convection in the lateral direction is insignificant. That is, the lateral heat airflow is not effective for heat dissipation. Thus, in this invention, the grooves 43a are formed between the waved reflector 43 and the plate 44 with contact therebetween, and the trench structures 45 are arranged in parallel on the plate 44. Thus, the heat convection can be effectively achieved and more air can flow therein via the openings 42a of the supporting element 42. The heat from the lamps 46 and the air are mixed and dissipated through the holes 48 of the plate 44. Thus, heat convection is effectively increased with increased area for heat convection with airflow. Note that the trench structures 45 can also enhance the strength of the plate 45, and the trench structures 45 can be referred to as strengthened ribs.

The hot air and airflow can be mixed in the grooves 43a and the trench structures 45 and transmitted out through the holes 48 or the openings 42a. The temperature of the backlight module can be effectively reduced such that the lamps 46 can operate in an adequate working temperature to produce higher light intensity.

Figure 6:
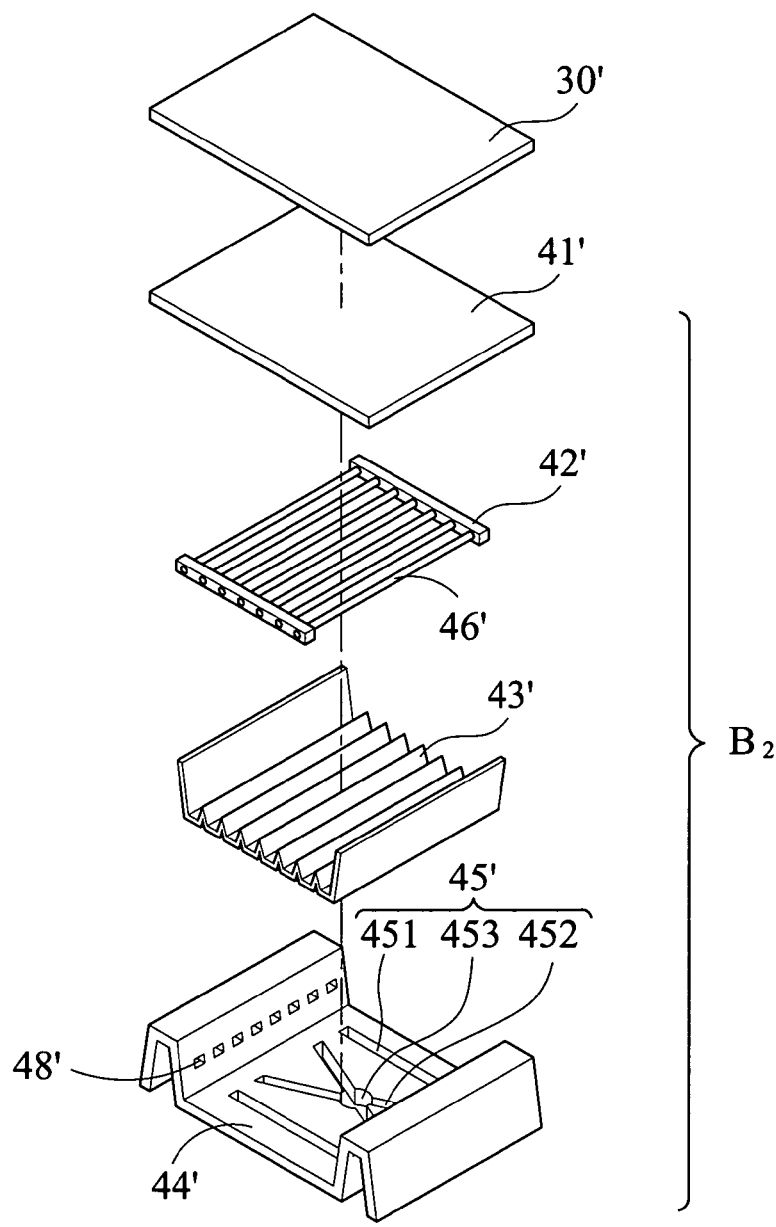
FIG. 6 is an exploded view of another embodiment of a liquid crystal display.
Figure 7:
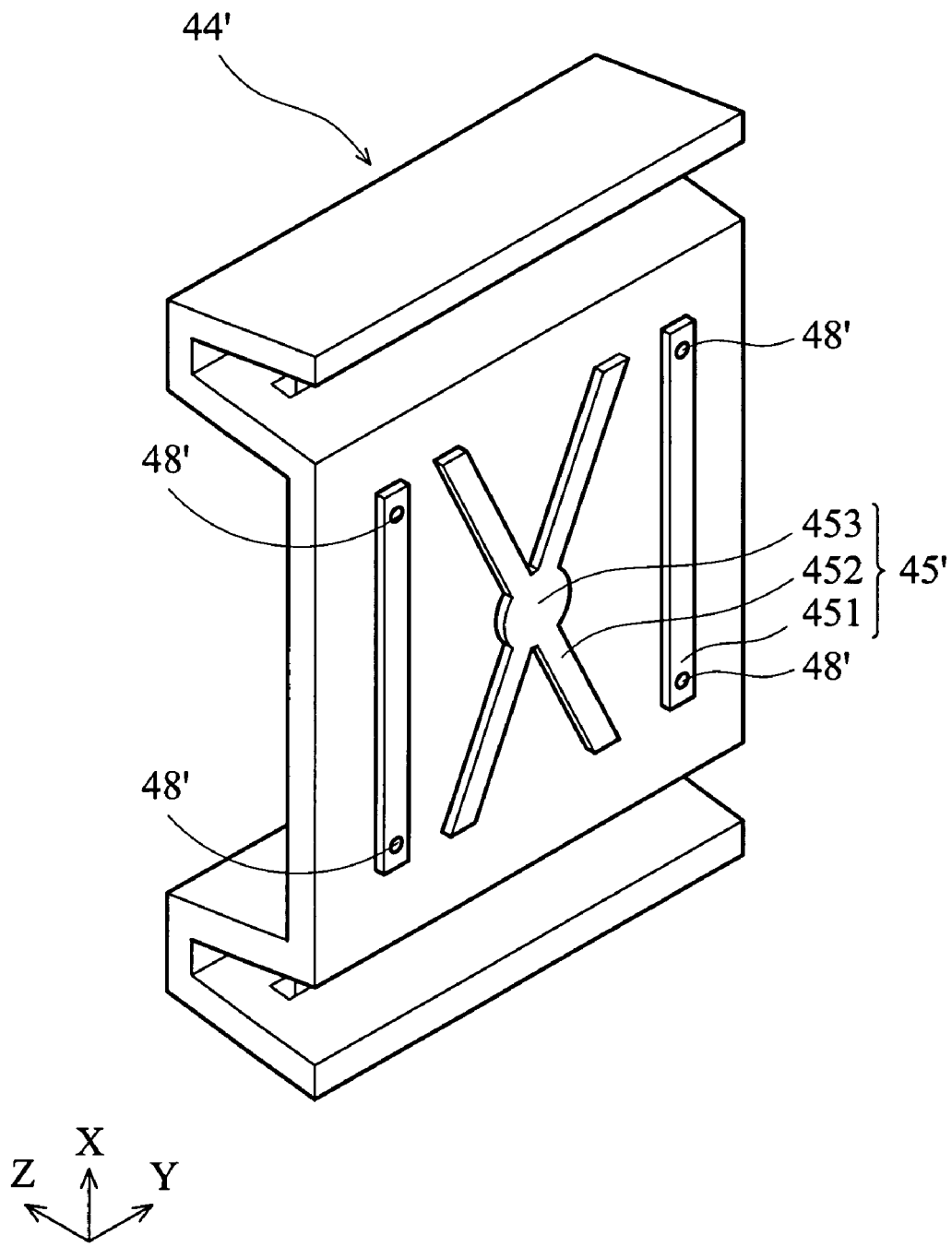
FIG. 7 is a rear view of a bottom plate of a backlight module.

FIG. 6 is an exploded view of another embodiment of a liquid crystal display $L_2$. FIG. 7 is a rear view of a bottom plate of a backlight module $B_2$. The liquid crystal display $L_2$ comprises a liquid crystal panel 30', and a backlight module $B_2$. Note that the invention is focused on the backlight module $B_2$, and the other elements in the liquid crystal display are omitted.

In this embodiment, the description of the elements common to the above embodiment with the same symbols is omitted. The difference is that the plate 44' of the backlight module $B_2$ comprises trench structures 45' in different shapes and arrangements. The trench structures 45' comprise a plurality of longitudinal channels 451 and 452 and a circular channel 453. The longitudinal channels 451 are arranged in parallel and perpendicular to the extending direction of the lamp 46'. Another channel 452 intersects the circular channel 453. Moreover, a plurality of holes 48' are formed on the trench structures 45' of the plate 44'. The trench structures 45' increase air space such that hot air can be mixed therein and dissipated out through the holes 48'. Heat convection area is increased, and structural strength of the plate 44' can be enhanced accordingly.

In conclusion, the trench structures and the wave-shaped reflectors are effectively combined to increase the heat convection area, thus an adequate lamp working environment is provided and light intensity of the backlight module is maximized.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module, comprising:
    a plurality of lamps;
    a reflector, disposed under the plurality of lamps, comprising a plurality of grooves; and
    a plate, disposed under the reflector, comprising a plurality of trench structures, wherein an extending direction of one of the trench structures is substantially not parallel to an extending direction of one of the plurality of lamps, and an extending direction of one of the grooves is substantially not parallel to an extending direction of one of the trench structures.

2. The backlight module as claimed in claim 1, wherein the plurality of grooves are substantially parallel to the lamps, and at least one of the plurality of grooves is disposed between two adjacent lamps.

3. The backlight module as claimed in claim 1, wherein the cross-section of the grooves is substantially V-shaped or arch-shaped.

4. The backlight module as claimed in claim 1, further comprising a supporting element with at least one opening formed thereon for supporting the plurality of lamps.

5. The backlight module as claimed in claim 1, wherein the plate further has at least one hole formed thereon.

6. The backlight module as claimed in claim 1, wherein the trench structures protrude away from the reflector.

7. The backlight module as claimed in claim 1, wherein the cross-section of one of the trench structures is circular, elliptical, or rectangular.

8. The backlight module as claimed in claim 1, wherein the trench structures are mutually arranged in parallel or crisscross.

9. The backlight module as claimed in claim 1, wherein the plate comprises aluminum.

10. The backlight module as claimed in claim 1, wherein the plate further comprises at least two non-horizontal side surfaces and at least two standing portions away from the at least two non-horizontal side surfaces.

11. The backlight module as claimed in claim 10, wherein the plate further comprises at least two connecting portions connecting the at least two standing portions and the at least two non-horizontal side surfaces.

12. The liquid crystal display as claimed in claim 1, further comprising a diffusion sheet disposed directly on and contacting the plate, wherein the plate substantially supports the diffusion sheet.

13. The backlight module as claimed in claim 12, wherein the plate further comprises at least two non-horizontal side surfaces and at least two standing portions away from the at least two non-horizontal side surfaces.

14. The liquid crystal display as claimed in claim 13, wherein the plate further comprises at least two connecting portions connecting the at least two standing portions and the at least two non-horizontal side surfaces.

* * * * *